R. J. JORDAN & J. H. BARRON.
Manure and Guano Distributor.

No. 200,729. Patented Feb. 26, 1878.

UNITED STATES PATENT OFFICE.

ROBERT J. JORDAN AND JAMES H. BARRON, OF BOWENVILLE, GEORGIA.

IMPROVEMENT IN MANURE AND GUANO DISTRIBUTERS.

Specification forming part of Letters Patent No. 200,729, dated February 26, 1878; application filed December 18, 1877.

*To all whom it may concern:*

Be it known that we, ROBT. J. JORDAN and J. H. BARRON, of Bowenville, in the county of Carroll, and in the State of Georgia, have invented certain new and useful Improvements in Manure and Guano Distributers; and do hereby declare that the following is a full, clear, and exact description thereof, reference being had to the accompanying drawings, and to the letters of reference marked thereon, making a part of this specification.

The nature of our invention consists in the construction and arrangement of a fertilizer, pulverizer, and distributer, as will be hereinafter more fully set forth.

In order to enable others skilled in the art to which our invention appertains to make and use the same, we will now proceed to describe its construction and operation, referring to the annexed drawing, in which—

Figure 1:
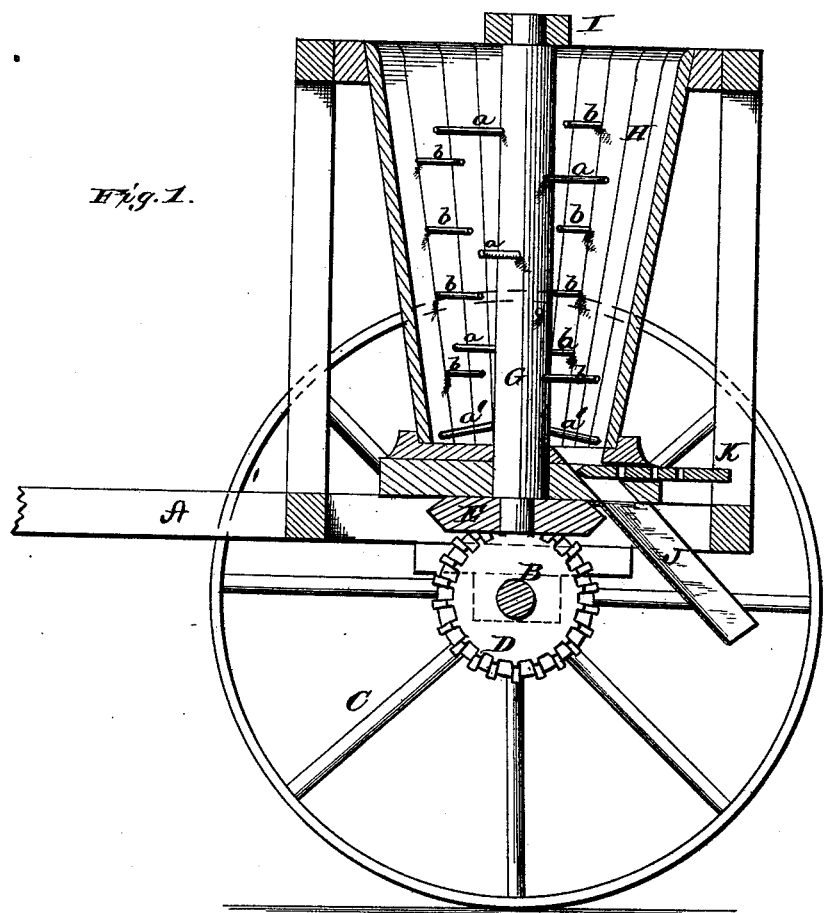
Figure 2:
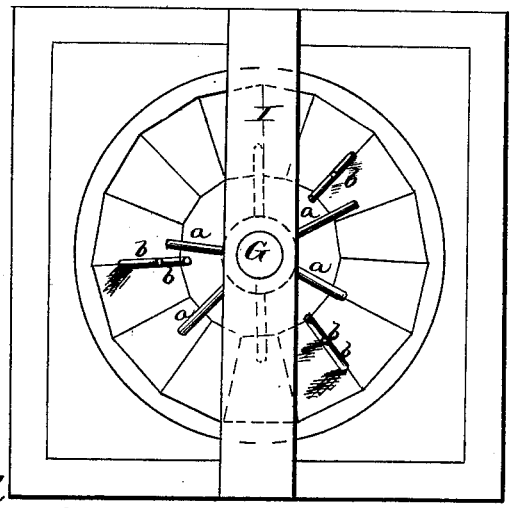

Figure 1 is a central vertical section of our machine. Fig. 2 is a plan view of the same.

A represents the frame of the machine, having suitable boxes, in which the axle B rotates. The wheels C are, one fast on the axle, while the other is loose thereon, which is necessary in case of turning around.

On the axle B is a cog-wheel, D, which meshes in a cog-wheel, E, attached to a shaft, G, that passes through the center of the hopper H. The lower bearing for the shaft G is the floor or bottom of the hopper, while the upper bearing is a bar, I, passing across the top of the hopper, and bolted to the frame thereof.

To the shaft G are attached spikes $a$ $a'$, at about equal distances from each other, which spikes pass between similar spikes, $b$, coming from the outside of the hopper and projecting inward into the same. The two sets of spikes grind the fertilizer, thereby rendering it easy of escape through the spout J.

The last row of spikes $a'$ on the shaft are inclined downward, and brush over the escape-hole in the bottom of the hopper, and they are turned slightly sidewise to force the fertilizer out with more regularity. All the spikes are intended to be rather flat and rounding on the edges.

K is a gage to regulate the feed.

The hopper H is made in the form of an inverted truncated cone, and is constructed of a series of longitudinal strips, as shown.

By this construction the teeth can be arranged to come close to the inner surface of the cylinder, and yet not touch the same, and the whole quantity of manure will pass out after being pulverized, and in just such quantities as desired.

The machine is very simple in construction, and yet durable and effective in its operation.

Having thus fully described our invention, what we claim as new, and desire to secure by Letters Patent, is—

In a fertilizer-distributer, the hopper H, made in the form of an inverted truncated cone, and composed of a series of narrow strips jointed together and provided with the spikes $b$, in combination with the upright shaft G, with spikes $a$ and inclined spikes $a'$, and provided with a gear-wheel on its bottom, which takes into a gear-wheel on the axle of the machine, all substantially as and for the purposes herein set forth.

In testimony that we claim the foregoing we have hereunto set our hands and seals this 24th day of November, 1877.

ROBERT JAMES JORDAN. [L. S.]
JAMES HENRY BARRON. [L. S.]

Witnesses:
 A. J. HINES,
 J. W. DUNLIN.